(12) United States Patent
Kyo

(10) Patent No.: US 8,131,978 B2
(45) Date of Patent: Mar. 6, 2012

(54) RESTORING PLURAL INSTRUCTIONS FOR SAME CYCLE EXECUTION FROM PARTIAL INSTRUCTIONS AND COMBINED SUPPLEMENTING PORTIONS GENERATED FOR COMPACT STORAGE

(75) Inventor: Shorin Kyo, Tokyo (JP)

(73) Assignee: NEC Corporation, Tokyo (JP)

( * ) Notice: Subject to any disclaimer, the term of this patent is extended or adjusted under 35 U.S.C. 154(b) by 474 days.

(21) Appl. No.: 12/308,390

(22) PCT Filed: Jun. 15, 2007

(86) PCT No.: PCT/JP2007/062118
§ 371 (c)(1),
(2), (4) Date: Dec. 12, 2008

(87) PCT Pub. No.: WO2007/145319
PCT Pub. Date: Dec. 21, 2007

(65) Prior Publication Data
US 2010/0161944 A1    Jun. 24, 2010

(30) Foreign Application Priority Data
Jun. 15, 2006 (JP) .................. 2006-166077

(51) Int. Cl.
*G06F 9/38* (2006.01)
(52) U.S. Cl. ............................ 712/210; 712/215
(58) Field of Classification Search .................. None
See application file for complete search history.

(56) References Cited

U.S. PATENT DOCUMENTS
5,878,267 A    3/1999  Hampapuram et al.
6,044,450 A    3/2000  Tsushima et al.
6,367,067 B1*  4/2002  Odani et al. ............ 717/154
7,002,595 B2*  2/2006  Wilson .................... 345/604
2003/0023960 A1* 1/2003 Khan et al. ............ 717/152
2005/0182916 A1  8/2005  Kageyama et al.
2009/0024840 A1* 1/2009 Kazuma ................. 712/226

FOREIGN PATENT DOCUMENTS
| EP | 0 992 892 | 4/2000 |
| JP | 5-150979 | 6/1993 |
| JP | 8-95783 | 4/1996 |
| JP | 9-265397 | 10/1997 |
| JP | 2005-227942 | 8/2005 |
| WO | 98/27486 | 6/1998 |

OTHER PUBLICATIONS
European Search Report dated Jun. 10, 2009.
* cited by examiner

*Primary Examiner* — Kenneth Kim
(74) *Attorney, Agent, or Firm* — McGinn IP Law Group, PLLC

(57) ABSTRACT

An original first instruction word (I1) to an original third instruction word (I3) include a bit field (L11) and a bit field (L12) to a bit field (L31) and a bit field (L32). An information word (IW) includes a set of some of bit fields belonging to a plurality of instruction words executed in the same cycle, which are the bit field (L12) of the original first instruction word (I1) to the bit field (L32) of the original third instruction word (I3). An instruction decoder (103) of a processor (100) decomposes the information word (IW) and restores the arrangements of the original first instruction word (I1) to the original third instruction word (I3) by combining the bit field (L11) to the bit field (L31) to the bit field (L12) to the bit field (L32). This can reduce the amount of memory consumption without degrading the instruction execution performance.

21 Claims, 8 Drawing Sheets

US 8,131,978 B2

RESTORING PLURAL INSTRUCTIONS FOR SAME CYCLE EXECUTION FROM PARTIAL INSTRUCTIONS AND COMBINED SUPPLEMENTING PORTIONS GENERATED FOR COMPACT STORAGE

TECHNICAL FIELD

This application claims the priority based on Japanese patent application No. 2006-166077 filed on Jun. 15, 2006, the disclosure of which is incorporated herein in its entirety by reference.

The present invention relates to a processor and an instruction control method and, more particularly, to a processor and instruction control method which can reduce the amount of memory consumption without degrading instruction execution performance.

BACKGROUND ART

In a programmable processor which fetches and executes one or more instruction words from a program memory in each cycle, in order to improve the usage of a precious program memory resource, it is generally necessary to use a fixed instruction word length. In general, each instruction differs in a required bit count X depending on the contents of operation designation for the processor.

In general, processor operation can be designated most efficiently with instruction word length $X=A+B\times C+D+E$ [bits], where A [bits] is the bit count of an opcode, B [bits] is the bit count required to express the number of registers which can be designated in an operand, C is a register count needs to be designated, D [bits] is the bit count of a flag modifying the operation of an instruction, and E [bits] is the bit count of an immediate field. Consider, for example, dyadic operation and monadic operation. The former is larger in C than the latter by one, and hence generally differs in the optimal word length X for each instruction or each instruction type.

Assume that only one type of fixed instruction word length Y is available. In this case, therefore, if X<Y concerning a given instruction, a space which is unnecessary under normal conditions is generated in the instruction word, resulting in the degraded usage of the program memory. In addition, if X>Y concerning a given instruction, the number of bits of the instruction must be decreased to match X with Y. This degrades the operation designation efficiency of the instruction for the processor. Under the circumstances, for example, Japanese Patent Laid-Open No. 8-95783 (reference 1) discloses a variable-word-length programmable processor which is provided with a predetermined basic word length and simultaneously uses a plurality of instruction word lengths of integer multiples of the basic word length.

In this case, instruction set design can be performed such that the double word length is assigned to an instruction consuming a larger bit count, and the basic word length is assigned to an instruction other than such instruction. This technique therefore improves the usage of the program memory to a certain extent and facilitates implementing a high-performance processor by increasing the degree of freedom in each instruction design without impairing the merit of a fixed instruction word length, i.e., that no gap is produced in the program memory space.

In addition, for example, Japanese Patent Laid-Open No. 5-150979 (reference 2) discloses a technique for a VLIW processor which has a dedicated instruction to designate the extension of an immediate field, instead of increasing the number of types of word lengths, in consideration of large differences between requests for the respective instructions with respect to the length of the immediate field.

DISCLOSURE OF INVENTION

Problem to be Solved by the Invention

According to the related art disclosed in reference 1, when an instruction word length is to be set to an integer multiple $n\times Y$ (n=1, 2, . . . ) of a predetermined basic word length Y, an optimal word length X for each instruction or each type of instruction inevitably differs from a given integer multiple of the basic word length, resulting in the following problems.

That is, if a word length $i\times Y$, of word lengths $n\times Y$ smaller than X, which is nearest to X is selected as the word length of a given type of instruction, a bit count of X is reduced by $X-(i\times Y)$ bits corresponding to the difference between X and $i\times Y$. This degrades the operation designation efficiency for the processor (i.e., degrades the instruction execution performance).

If a word length $j\times Y$, of word lengths $n\times Y$ larger than X, which is nearest to X is selected as the word length of the above instruction, an extra portion of the memory area is uselessly consumed by $(j\times Y)-X$ bits. This degrades the program memory usage (i.e., increases the amount of memory consumption).

According to another related art disclosed in reference 2, even if only the immediate field can be extended by a dedicated instruction of another word in the same cycle, this technique is one of variable length type techniques in reference 1 which has two types of instruction word lengths, i.e., a single length and a double length. Therefore, the technique also has the above problems.

It is an object of the present invention to provide a processor and instruction control method which reduce the amount of memory consumption without degradation of instruction execution performance, which is a problem in the related art.

Means of Solution to the Problem

A processor of the present invention is characterized by decomposing, at the time of execution, an information word comprising a set of some of bit fields belonging to a plurality of instruction words executed in the same cycle, and restoring each instruction word into an original arrangement.

An instruction control method of the present invention is characterized by comprising the step of causing a processor to decompose, at the time of execution, an information word comprising a set of some of bit fields belonging to a plurality of instruction words executed in the same cycle and restore each instruction word into an original arrangement.

EFFECTS OF THE INVENTION

The present invention has an effect that it can reduce the amount of memory consumption without degrading the instruction execution performance.

This is because a processor is configured to decompose, at the time of execution, an information word comprising a set of some of bit fields belonging to a plurality of instruction words executed in the same cycle and restore each instruction word into an original arrangement.

BEST MODE FOR CARRYING OUT THE INVENTION

Figure 1:
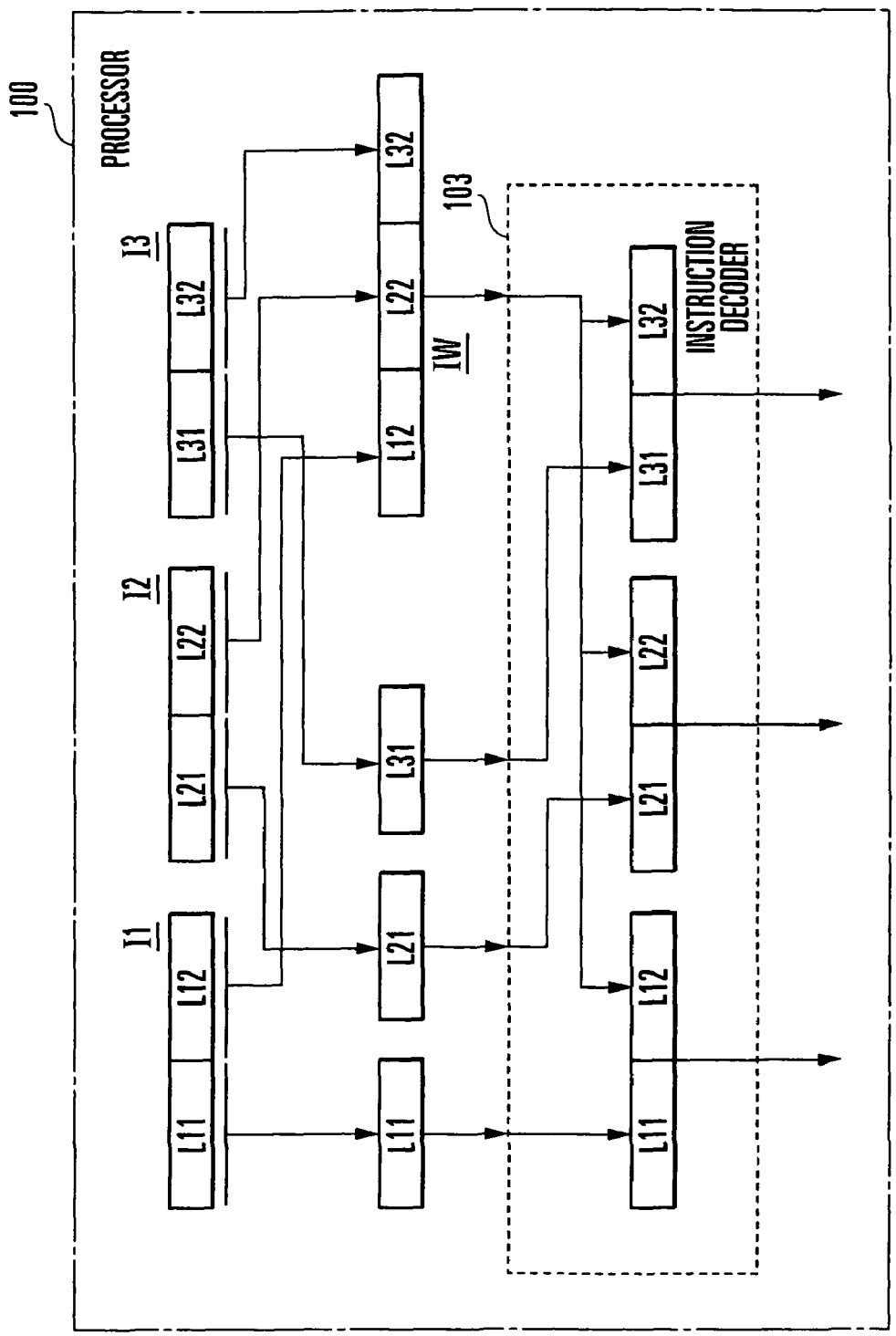
FIG. 1 is a block diagram showing the arrangement of the first exemplary embodiment of the present invention.

The first exemplary embodiment of the present invention will be described in detail next with reference to the accompanying drawings. FIG. 1 is a block diagram showing the arrangement of the first exemplary embodiment of the present invention. Referring to FIG. 1, a processor 100 of the first exemplary embodiment of the present invention includes an instruction decoder 103 which decomposes an information word comprising a set of some of the bit fields belonging to a plurality of instruction words executed in the same cycle (e.g., at the same pipeline stage), and reproduces the original arrangement of each instruction word.

An original first instruction word I1 comprises a bit field L11 and a bit field L12. An original second instruction word I2 comprises a bit field L21 and a bit field L22. An original third instruction word I3 comprises a bit field L31 and a bit field L32.

An information word IW comprises the bit field L12 belonging to the original first instruction word I1, the bit field L22 belonging to the original second instruction word I2, and the bit field L32 belonging to the original third instruction word I3.

The instruction decoder 103 receives the bit field L11 as the first instruction word, the bit field L21 as the second instruction word, the bit field L31 as the third instruction word, and the information word IW in the same cycle. The first word L11 to the third instruction word L31 input to the instruction decoder 103 are obtained by respectively removing the bit fields L12 to L32 forming the information word IW from the original first word I1 to the third instruction word I3, and are also called partial instruction words.

The instruction decoder 103 then decomposes the information word IW into the bit field L12, the bit field L22, and the bit field L32.

The instruction decoder 103 restores the arrangement of the original first instruction word I1 by combining the bit field L11 to the bit field L12. The instruction decoder 103 also restores the arrangement of the original second instruction word I2 by combining the bit field L21 to the bit field L22. The instruction decoder 103 further restores the arrangement of the original third instruction word I3 by combining the bit field L31 to the bit field L32.

In the above arrangement, the bit fields L12 to L32 contained in the information word IW do not necessarily exist at the ends of the original first instruction word I1 to the original third instruction word I3. The bit fields L12 to L32 may exist at the starts or ends or at predetermined positions determined depending on the types of instructions. In restoration, the bit fields L12 to L32 are therefore inserted at the starts or ends or at predetermined positions determined depending on the types of instructions.

Although the case of three instruction words has been described above, the first exemplary embodiment of the present invention can be applied to n (n is an integer of two or more) instruction words.

The first exemplary embodiment of the present invention is configured to decompose an information word comprising a set of some of the bit fields belonging to a plurality of instruction words executed in the same cycle and reproduce the original arrangement of each instruction word, thereby reducing the amount of memory consumption without degrading the instruction execution performance.

Figure 2:
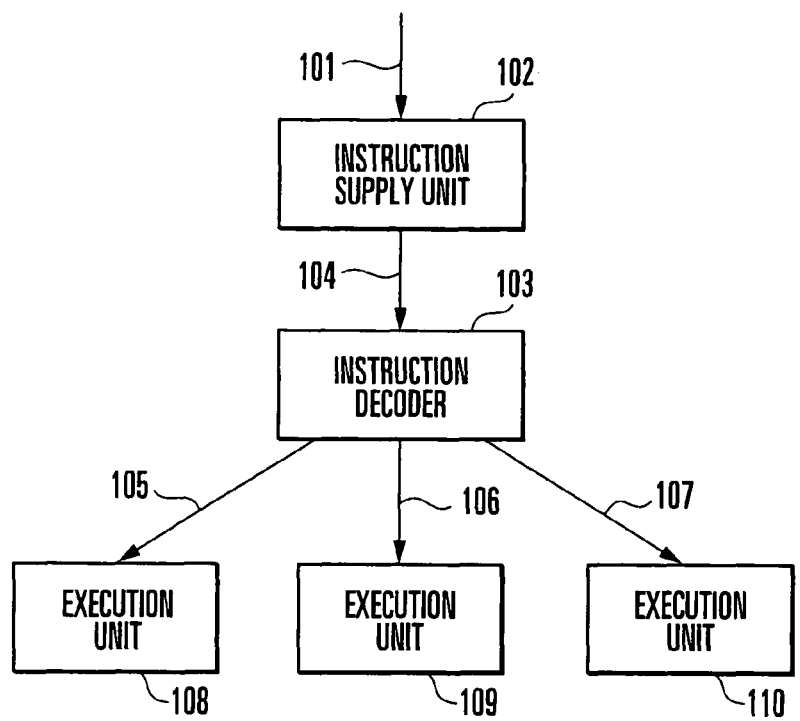
FIG. 2 is a block diagram showing the arrangement of the second exemplary embodiment of the present invention.

The second exemplary embodiment of the present invention will be described in detail next with reference to the accompanying drawings. A processor of the second exemplary embodiment of the present invention can execute three instructions at most in the same cycle, and can also execute instructions (to be precise, original instructions) having three types of instruction word lengths. FIG. 2 is a block diagram showing the arrangement of the second exemplary embodiment of the present invention.

Referring to FIG. 2, a processor 100 of the second exemplary embodiment of the present invention includes an instruction path 101, an instruction supply unit 102, an instruction decoder 103, an instruction path 104, a control information path 105, a control information path 106, a control information path 107, an execution unit 108, an execution unit 109, and an execution unit 110.

The instruction supply unit 102 is, for example, an instruction buffer, which stores instruction words and information words, and outputs three instruction words and an information word at most in the same cycle to the instruction decoder 103 via the instruction path 104. For example, the instruction supply unit 102 checks the information word identifier of each word. If there are one or two instruction words to be executed in the same cycle, and an information word follows (in a memory not shown), the instruction supply unit 102 shifts the information word to the end of one or two instruction words, and inserts a NOP instruction (No operation instruction) between the instruction word and the information word. The instruction supply unit 102 then outputs the result.

If the maximum number of instructions executed in the same cycle is n (n is an integer of one or more), and an information word follows the n instruction words, the instruction supply unit 102 places the information word at the end of the n instruction words, and outputs the result. If an information word follows m (m is an integer of one or more) instruction words which are less in number than n instruction words, the instruction supply unit 102 inserts n–m NOP instructions next to the m instruction words.

The instruction decoder 103 restores the original instruction words, and outputs pieces of control information corresponding to the respective instructions to the execution units 108 to 110 via the control information paths 105 to 107 on the basis of the restoration result. Control information is, for example, information which designates operation between operands. The execution units 108 to 110 execute instructions in the same cycle on the basis of control information.

Figure 3:
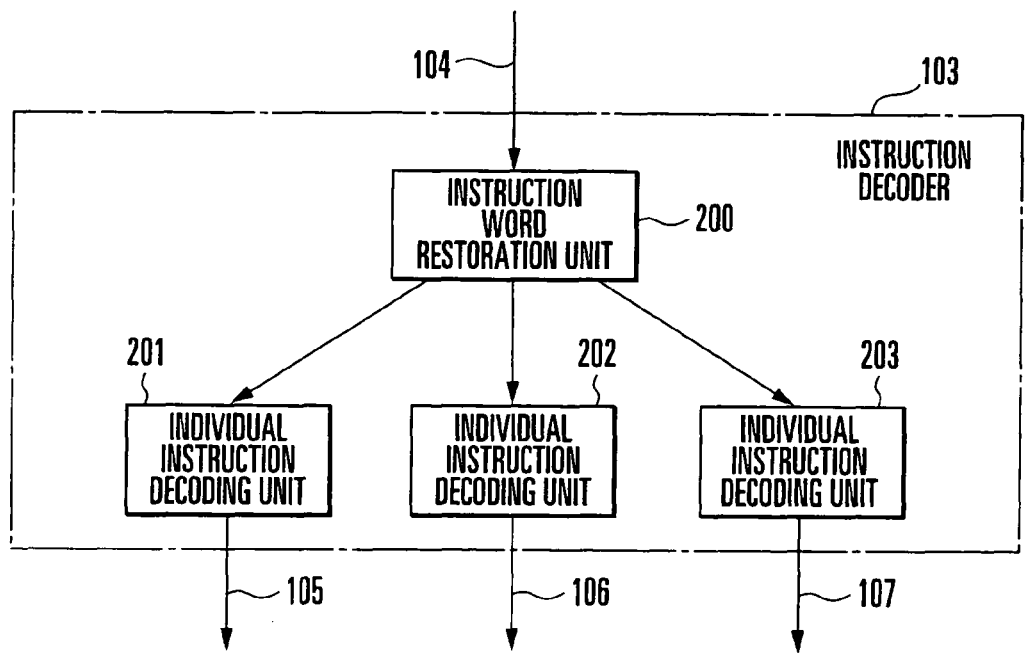
FIG. 3 is a block diagram showing the arrangement of an instruction decoder in FIG. 2.

FIG. 3 is a block diagram showing the arrangement of the instruction decoder 103 in FIG. 2. Referring to FIG. 3, the instruction decoder 103 includes an instruction word restoration unit 200, an individual instruction decoding unit 201 corresponding to the execution unit 108, an individual instruction decoding unit 202 corresponding to the execution unit 109, and an individual instruction decoding unit 203 corresponding to the execution unit 110.

Figure 4:
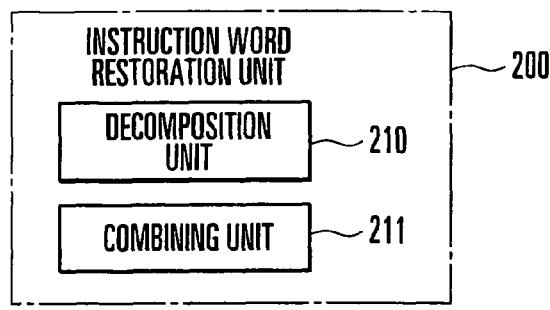
FIG. 4 is a block diagram showing the arrangement of an instruction word restoration unit in FIG. 3.

FIG. 4 is a block diagram showing the arrangement of the instruction word restoration unit 200 in FIG. 3. Referring to FIG. 4, the instruction word restoration unit 200 includes a decomposition unit 210 and a combining unit 211. The decomposition unit 210 decomposes an information word into a plurality of bit fields. The combining unit 211 restores each instruction word into the original arrangement by combining a plurality of instruction words (obtained by removing the bit fields of portions forming the information word from the original arrangements of the instruction words) to the corresponding bit fields decomposed by the decomposition unit 210.

Figure 5:
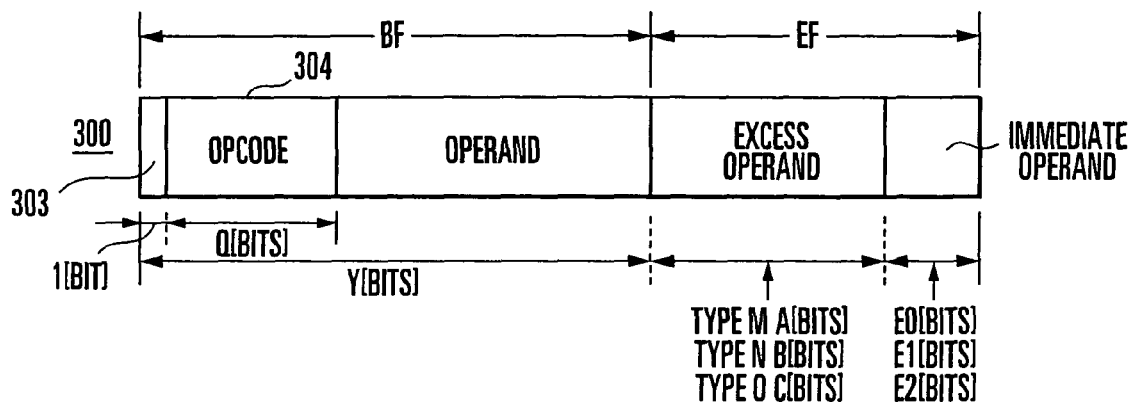
FIG. 5 is a view for explaining the format of an original instruction word.
Figure 5:
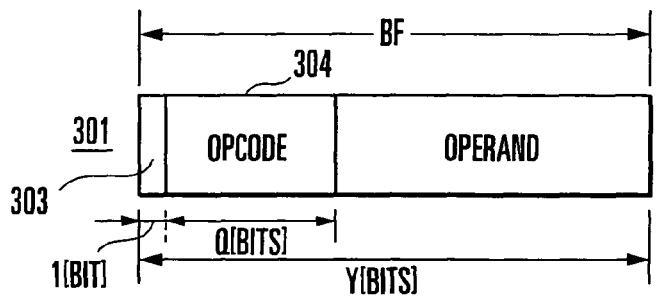
Figure 5:
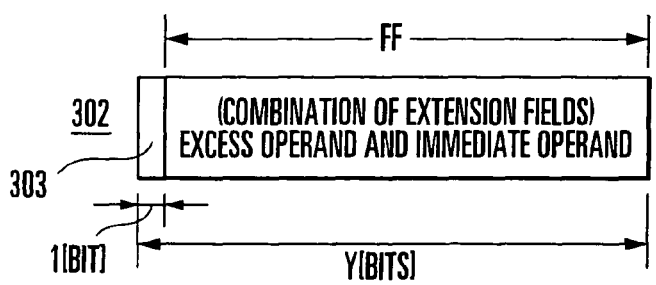

FIG. 5 is a view for explaining the format of an original instruction word. Referring to FIG. 5, an original instruction word 300 includes a basic field BF of Y [bits] and an extension field EF whose length is determined by the type of instruction. The basic field BF includes an information word identifier 303 of 1 [bit], an opcode 304 (operation code indicating the type of instruction) of Q [bits], and an operand of Y−Q−1 [bits]. The extension field EF includes an excess operand of A [bits], B [bits], or C [bits] determined by an instruction type M, N, or O.

The extension field EF can also include an immediate operand of E0 [bits], E1 [bits], or E2 [bits] determined by the instruction type M, N, or O or the like. If, therefore, an immediate operand is to be used, the word length of the original instruction word is Y+A+E0 [bits], Y+B+E1 [bits], or Y+C+E2 [bits] depending on the instruction type M, N, or O. If no immediate operand is to be used, the word length of the original instruction word is Y+A [bits], Y+B [bits], or Y+C [bits] depending on the instruction type M, N, or O.

The portion of the basic field BF of the original instruction word 300 of Y [bits] is isolated as an instruction word 301. The portion of the extension field EF is contained in an information word 302. The information word 302 includes the information word identifier 303 of 1 [bit] and a free bit field (a combination of extension fields EF of a plurality of instruction words executed in the same cycle as the original instruction word 300) FF.

Note that whether each instruction uses an immediate operand can be designated by, for example, the bit pattern of a predetermined operand in an operand designation bit field. That is, an instruction system can be implemented such that when one of the bit patterns of operands is a specific bit pattern, e.g., a pattern of all 1s, it indicates that the instruction uses an immediate operand instead of register number designation. An instruction using an immediate operand is executed such that the immediate operand is used in the self-instruction word.

Figure 6A:
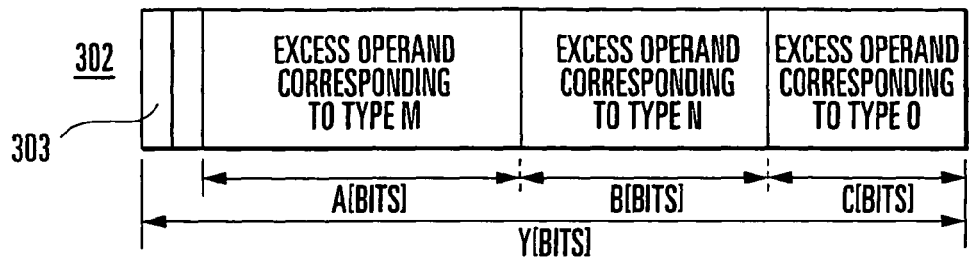
FIGS. 6A to 6C are views each for explaining an example of the format of an information word.
Figure 6B:
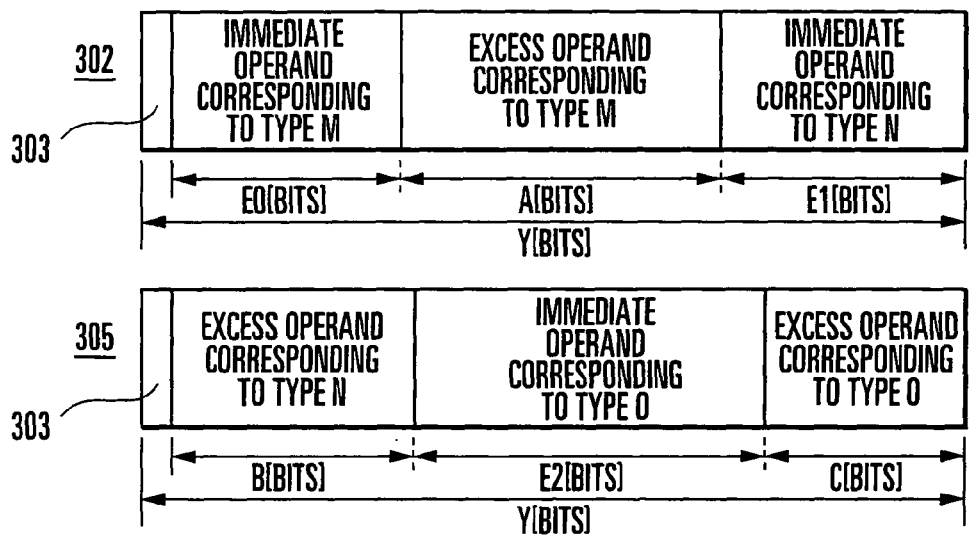
Figure 6C:
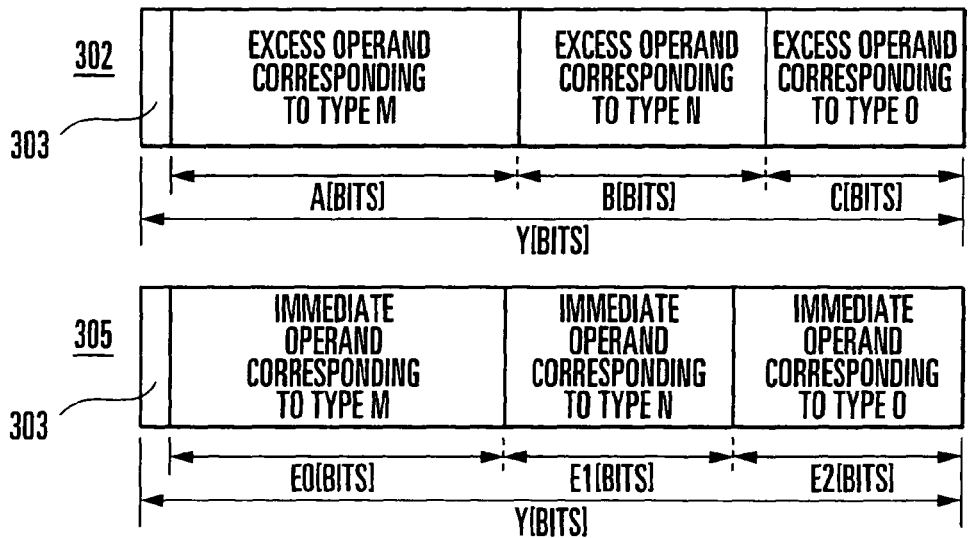

The format of the information word 302 will be described next with reference to the accompanying drawings. FIG. 6A is a view for explaining an example of the format of the information word 302 which is one word and comprises only excess operands without including any immediate operand. FIGS. 6B and 6C each are a view for explaining an example of the format of information words 302 and 305, across which excess operands and immediate operands are used.

Referring to FIG. 6A, the information word 302 includes right-aligned excess operands of C [bits], B [bits], and A [bits] corresponding to the instruction types O, N, and M. Note that the order of excess operands can be determined in accordance with the order of instruction words to be output from the instruction supply unit 102. FIG. 6A exemplifies a case in which instruction codes are sequentially arranged such that the code corresponding to the type M is placed first (on the left side), the code corresponding to the type N is placed second (in the middle), and the code corresponding to the type O is placed last (on the right side). The same applies to the cases shown in FIGS. 6B and 6C to be described later.

Referring to FIG. 6B, the information word 302 and the information word 305 include an excess operand of C [bits] corresponding to the instruction type O, an immediate operand of E2 [bits] corresponding to the instruction type O, an excess operand of B [bits] corresponding to the instruction type N, an immediate operand of E1 [bits] corresponding to the instruction type N, an excess operand of A [bits] corresponding to the instruction type M, and an immediate operand of E1 [bits] corresponding to the instruction type M, which are right-aligned.

In this case, an excess operand or immediate operand of a given one original instruction can be divided into parts, and the parts can be included in the information word 302 and the information word 305.

Referring to FIG. 6C, the information word 302 includes right-aligned excess operands of C [bits], B [bits], and A [bits] corresponding to the instruction types O, N, and M. The information word 305 includes immediate operands of E2 [bits], E1 [bits], and E0 [bits] corresponding to the instruction types O, N, and M. The above are examples, and other formats can be used.

The operation of the second exemplary embodiment of the present invention will be described next with reference to the accompanying drawings. The second exemplary embodiment of the present invention exemplifies an instruction system in which three or more instructions using no immediate data are executed in the same cycle. For the sake of simplicity, the following exemplifies a case in which Y is always larger than the total of three of A, B, and C. The following concerns the information word shown in FIG. 6A.

Figure 7:
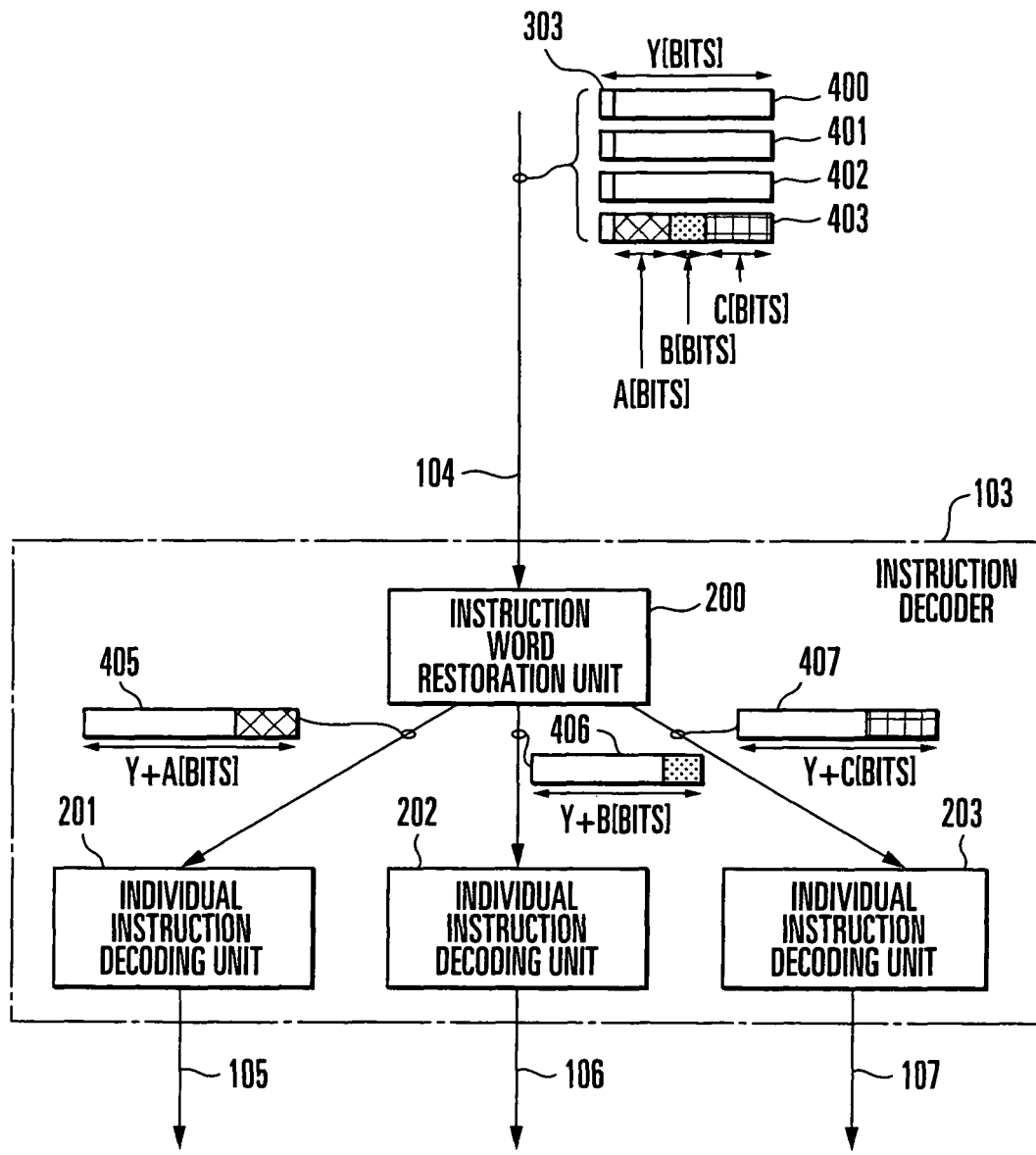
FIG. 7 is a view for explaining the operation of the second exemplary embodiment of the present invention.

FIG. 7 is a view for explaining the operation of the second exemplary embodiment of the present invention. Referring to FIG. 7, the instruction supply unit 102 outputs an instruction word 400 of the type M, an instruction word 401 of the type N, an instruction word 402 of the type O, and an information word 403, each having the fixed word length Y, in the same cycle via the instruction path 104. For the sake of simplicity, the following exemplifies a case in which the information word 403 is placed at the end, i.e., on the right side of the instruction words 400 to 402.

Upon receiving the instruction words 400 to 402 and the information word 403, the instruction word restoration unit 200 of the instruction decoder 103 determines from the information word identifier 303 of each word whether each word is an information word or an instruction word.

If each word is an information word, the instruction word restoration unit 200 uses the content of the free bit field FF for the restoration of each original instruction word. If each word is an instruction word, the instruction word restoration unit 200 discriminate the type of instruction from the opcode 304. The instruction word restoration unit 200 then extracts an excess operand of a bit count corresponding to the type of instruction from the free bit field FF of the information word 403 existing in the same cycle, as needed, and adds the excess operand to a proper portion (the end in FIG. 7) of the instruction word, thereby restoring the original instruction word.

That is, the instruction word restoration unit 200 restores the instruction words 400, 401, and 402 of the three types M, N, and O into original instruction words 405, 406, and 407 of word lengths Y+A [bits], Y+B [bits], and Y+C [bits], respectively. The instruction word restoration unit 200 then outputs the restored original instruction words 405, 406, and 407 to the individual instruction decoding units 201, 202, and 203, respectively.

The individual instruction decoding units 201 to 203 respectively decode the original instruction words 405 to 407 and output pieces of control information for the execution of the respective instructions to the execution units 108 to 110 via the control information paths 105 to 107.

The second exemplary embodiment of the present invention is configured to decompose an information word comprising a set of excess operands belonging to a plurality of instruction words executed in the same cycle and reproduce the original arrangement of each instruction word, thereby improving the usage of the memory and reducing the amount of memory consumption without degrading the operation designation efficiency for the processor 100.

The third exemplary embodiment of the present invention will be described in detail next with reference to the accompanying drawings. A processor 100 of the third exemplary embodiment of the present invention uses two information words and an immediate operand, unlike the second exemplary embodiment of the present invention. The arrangement of the third exemplary embodiment of the present invention is the same as that of the second exemplary embodiment shown in FIGS. 2 and 3. The third exemplary embodiment of the present invention executes three or more instructions using immediate data in the same cycle.

The operation of the third exemplary embodiment of the present invention will be described next with reference to the accompanying drawings. For the sake of simplicity, the following exemplifies a case in which Y is always larger than the total of any three of A, B, C, E0, E1, and E2, and is smaller than any four of them. The following concerns the information word shown in FIG. 6B.

Figure 8:
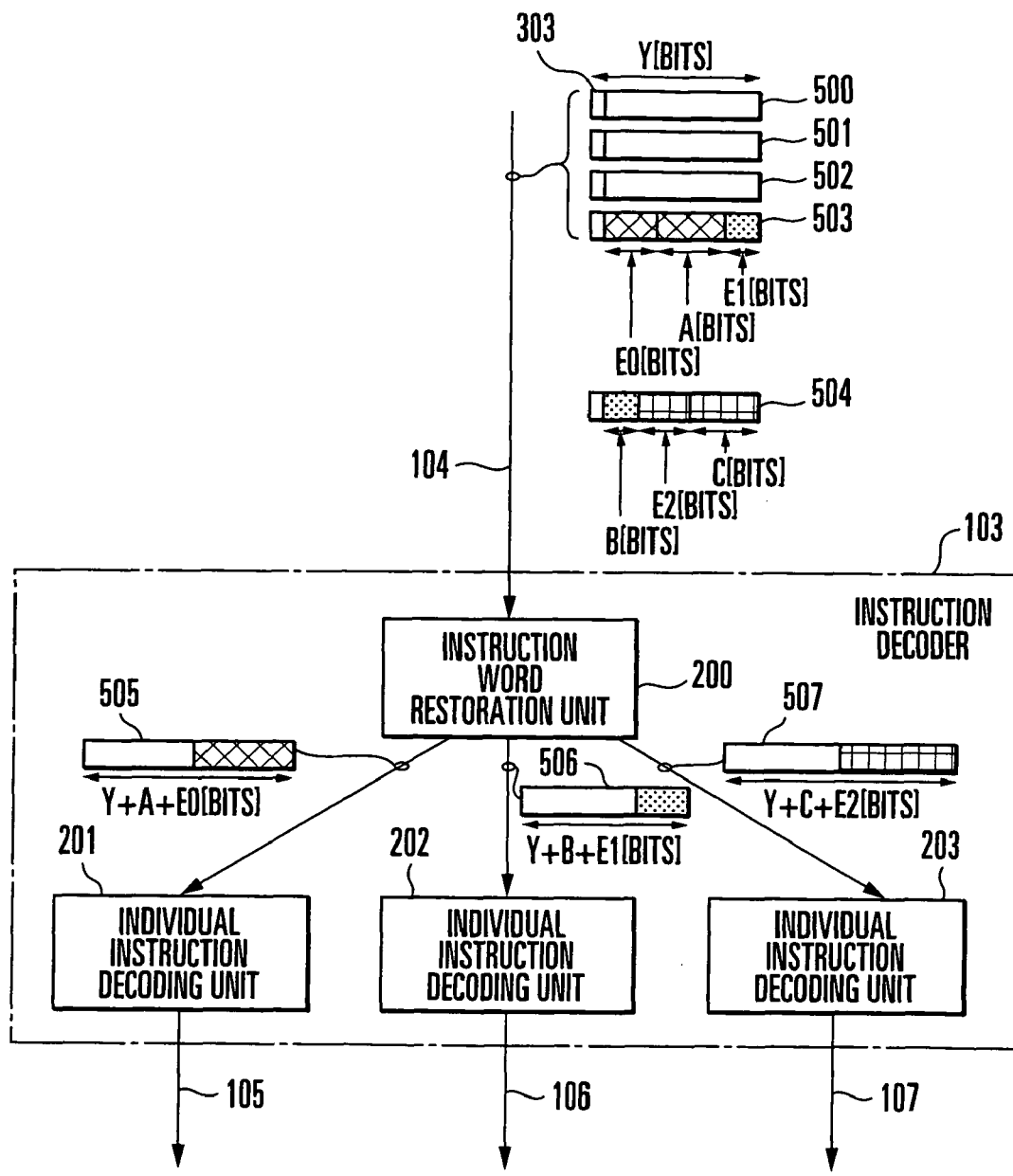
FIG. 8 is a view for explaining the operation of the third exemplary embodiment of the present invention.

FIG. 8 is a view for explaining the operation of the third exemplary embodiment of the present invention. Referring to FIG. 8, an instruction supply unit 102 outputs an instruction word 500 of a type M, an instruction word 501 of a type N, an instruction word 502 of a type O, information word 503, and information word 504, each having a fixed word length Y, via an instruction path 104. For the sake of simplicity, the following exemplifies a case in which the information word 503 and the information word 504 are arranged at the end, i.e., the right side of the instruction words 500 to 502.

Upon receiving the instruction words 500 to 502, the information word 503, and the information word 504, an instruction word restoration unit 200 of an instruction decoder 103 determines from an information word identifier 303 of each word whether each word is an information word or an instruction word.

If each word is an information word, the instruction word restoration unit 200 uses the content of a free bit field FF for the restoration of each instruction word. If each word is an instruction word, the instruction word restoration unit 200 discriminates the type of instruction from an opcode 304 of it. The instruction word restoration unit 200 then extracts an excess operand and immediate operand corresponding to a bit count corresponding to the type of instruction from the free bit fields FF of the information words 503 and 504 existing in the same cycle, as needed, and inserts the operands at a proper position (the end in FIG. 8) of the instruction word, thereby restoring the original instruction word.

That is, the instruction word restoration unit 200 restores the instruction words 500, 501, and 502 of the three types M, N, and O into original instruction words 505, 506, and 507 of word lengths Y+A+E0 [bits], Y+B+E1 [bits], and Y+C+E2 [bits], respectively. The instruction word restoration unit 200 then respectively outputs the restored original instruction words 505, 506, and 507 to individual instruction decoding units 201, 202, and 203.

The individual instruction decoding units 201 to 203 respectively decode the original instruction words 505 to 507, and output pieces of control information for the execution of the respective instructions to execution units 108 to 110 via control information paths 105 to 107.

The operation of the third exemplary embodiment of the present invention will be described in more detail next. The following exemplifies a case in which instructions of the types M, N, and O always require information words, and one or more information words always exist in each cycle.

If, for example, one or more information words are placed at the end (right side) of a word group 800 executed in each cycle, the information words can also be used to delimit instructions to indicate whether they are instructions to be executed in the same cycle. Therefore, when less than three instruction words are to be executed in the same cycle, there is no need to separately provide, in an instruction word, any dedicated bit field expressing the number of instructions executed in the cycle. The following therefore exemplifies a case in which an information word is always placed at the end of an instruction group executed in each cycle.

Figure 9:
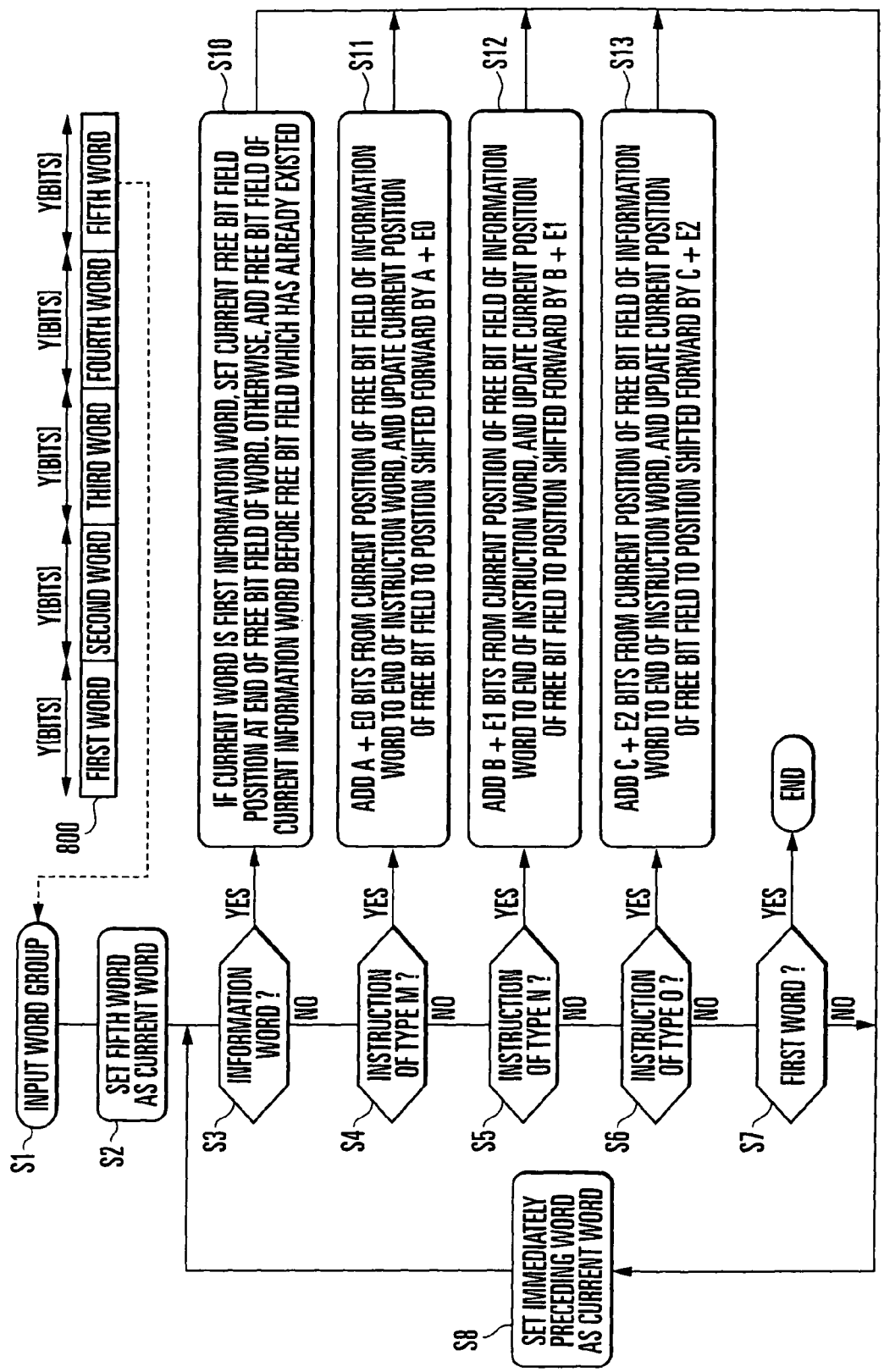
FIG. 9 is a flowchart showing the operation of an instruction word restoration unit.

FIG. 9 is a flowchart showing the operation of the instruction word restoration unit 200. Referring to FIG. 9, the instruction word restoration unit 200 of the instruction decoder 103 receives the word group 800 in the same cycle (step S1 in FIG. 9). The word group 800 comprises instruction words executed in the same cycle and a required number of information words. Assume that the word group 800 has Y [bits]×5 [words]. For the sake of simplicity, assume that Y is a constant.

The instruction word restoration unit 200 sets the fifth word (i.e., the information word) placed at the end of the word group 800 as a current word (step S2). The instruction word restoration unit 200 then performs the processing in steps S3 to S6 for the current word.

The instruction word restoration unit 200 performs the processing in steps S7 and S8 to update the current word, and sequentially performs the processing in steps S3 to S6 for each preceding word.

Upon discriminating from an information word identifier 303 that the current word is an information word (YES in step S3), the instruction word restoration unit 200 makes preparations to use the free bit field FF of the current word for processing for a succeeding instruction word. That is, if the current word is the first information word, the instruction word restoration unit 200 sets the current free bit field position to the end of the free bit field FF. If the current word is not the first information word, the instruction word restoration unit 200 adds the free bit field FF of the information word at a position before the existing free bit field FF (step S10).

Upon discriminating that the current word is not an information word (NO in step S3), the instruction word restoration unit 200 discriminates the type of the instruction word as the current word (step S4, S5, or S6). The instruction word restoration unit 200 extracts a bit field (excess operand or immediate operand) having a bit length corresponding to the type of instruction from the current free bit field position, and adds the bit field to the end of the instruction word (current word), thereby restoring the instruction word (current word) into an original instruction word of the original word length. The instruction word restoration unit 200 updates the current free bit field position by shifting it forward by the bit length of the extracted bit field (step S11, S12, or S13). With this operation, the instruction word restoration unit 200 restores the instruction word length of each original instruction word.

The third exemplary embodiment of the present invention is configured to decompose an information word comprising a set of excess operands and immediate operands belonging to a plurality of instruction words executed in the same cycle and reproduce the original arrangement of each instruction word, thereby improving the usage of the memory and reducing the amount of memory consumption without degrading the operation designation efficiency for the processor 100.

A concrete example of the first, second, or third exemplary embodiment of the present invention will be described next. A microprocessor according to this concrete example executes an instruction system including dyadic instructions (type M), monadic instructions (type N), and nullary instructions (type O) which do not explicitly take operands. The microprocessor according to the concrete example always executes three instructions in the same cycle.

A bit count S of an information word identifier is 1 [bit]. A bit count OP of an opcode is 7 [bits]. The number of registers which can be designated in an operand is 32. A bit count REG for register designation which designates each register is 5 [bits]. The following exemplifies a case in which designation register counts for a dyadic instruction, a monadic instruction, and a nullary instruction are three (two sources and one destination), two (one source and one destination), and one (on destination), respectively, and a required bit count IMM of an immediate field is 1 to 16.

In a case in which no immediate operand is used, the optimal instruction word lengths of a dyadic instruction (type M), monadic instruction (type N), and nullary instruction (type O) are respectively S+OP+REG×3=1+7+5×3=23 [bits], S+OP+REG×2=1+7+5×2=18 [bits], and S+OP+REG×1=1+7+5×1=13 [bits].

In a case in which an immediate operand is used, the optimal instruction word lengths of a dyadic instruction (type M), monadic instruction (type N), and nullary instruction (type O) are respectively S+OP+REG×3+IMM=1+7+5×3+16=39 [bits], S+OP+REG×2+IMM=1+7+5×2+16=34 [bits], and S+OP+REG×1+IMM=1+7+5×1+16=29 [bits].

When an instruction word length is to be determined, with importance being placed on processor performance, by using a general technique (also called related technique 1) using a single instruction word length, the instruction word length is set to the fixed word length 39 [bits] in accordance with the optimal word length of a dyadic instruction which is the longest. When an instruction word length is determined, with importance being placed on processor performance, by using a related technique (also called related technique 2; see, for example, "reference 1") based on a variable-word-length scheme using two types of word lengths, i.e., a basic word length and the double word length, the instruction word lengths are two types of word lengths, i.e., the basic word length 29 [bits] and the double word length 58 [bits].

In contrast to this, assume that in the concrete example of the present invention, fixed word length Y=18 [bits]. In this case, if no immediate operand is to be used (which corresponds to FIG. 7), it suffices to respectively set a bit count A of the excess operand of a dyadic instruction (type M with 23 [bits] as described above), a bit count B of the excess operand of a monadic instruction (type N with 18 [bits] as described above), and a bit count C of the excess operand of a nullary instruction (type O with 13 [bits] as described above) to A=23−18=5 [bits], B=18−18=0 [bit], and C=0 [bit] (because 18>13). When an immediate operand is to be referred to (which corresponds to FIG. 8), it suffices to set E0, E1, and E2 to a maximum of 16 [bits] as well as setting A, B, and C.

In all possible instruction issuance patterns associated with the three types of instructions, i.e., M, N, and O, the maximum value of the total of arbitrary three values of A, B, and C is A+A+A=5+5+5=15 [bits]. Since this maximum value 15 [bits] is smaller than fixed word length Y−1=18−1=17 [bits], if instructions using no immediate operand are to be issued, it suffices to always issue only an information word corresponding to one word in each cycle.

Consider next a case in which instructions using immediate operands and instructions using no immediate operand exist together (i.e., the states in FIGS. 7 and 8 exist together). Table 1 indicates the relationship between an instruction issuance pattern in a case in which the above types of instructions exist together and the number of bits which can be used as an immediate operand in the first information word.

TABLE 1

| Instruction Issuance Pattern (All Combinations) | Number of Bits Which Can Be Used as Immediate Operand in First Information Word |
|---|---|
| 3 dyadic instructions | 18 − 1 − 5 × 3 = 2 [bits] |
| 2 dyadic instructions and 1 monadic instruction | 18 − 1 − 5 × 2 = 7 [bits] |
| 1 dyadic instruction, 1 monadic instruction, and 1 nullary instruction | 18 − 1 − 5 = 12 [bits] |
| 2 monadic instructions and 1 nullary instruction | 18 − 1 = 17 [bits] |
| 2 monadic instructions and 1 dyadic instruction | 18 − 1 = 17 [bits] |
| 1 monadic instruction and 2 nullary instructions | 18 − 1 = 17 [bits] |
| 3 monadic instructions | 18 − 1 = 17 [bits] |
| 3 nullary instructions | 18 − 1 = 17 [bits] |

If the above types of instructions exist together, the second information word is not always required. This is because, depending on an instruction issuance pattern, an unused free bit field FF exists as an excess operand in the first information word and can be used as an immediate operand, as indicated by Table 1.

That is, if such unused free bit field FF falls within the bit count of an immediate operand which is required for an instruction, there is no need to add any new information word for the cycle. As described above, in this concrete example, even if there is an instruction using an immediate operand executed in the same cycle, it is not always necessary to increase the number of information words.

A detailed comparison between this concrete example and related technique 1 described above which uses a single instruction word length and related technique 2 described above which uses variable word lengths, i.e., two types of word lengths reveals the following effects of the concrete example.

Related technique 1 always requires 39×3=117 [bits] in each cycle. Related technique 2 requires 87 [bits] (a case of three instruction words with a shorter word length: 29×3) to 174 [bits] (a case of three instruction words with a longer word length=58×3). According to this concrete example using the fixed word length 18 [bits], in a rare case in which three instructions each simultaneously use an immediate operand of a significant digit of 16 [bits] in the same cycle, 18×(3+4)=126 [bits] are consumed.

In this case, the above value "4" is calculated as follows. The excess operand of one instruction word has 4 [bits]. The maximum value of an immediate operand is 16 [bits]. Therefore, an information word requires (4+16)×3=63 [bits] as a whole. Since 3<(63/17)<4, a maximum of four information words are required in one cycle.

Most cases require a total of four or five words including three instruction words and one or two information words, i.e., about 18×4=72 [bits] to 18×5=90 [bits].

This concrete example can therefore reduce the program memory consumption amount by about (117−72)/117=38 [%] to (117−90)/117=22[%] in average as compared with related technique 1. In related technique 2, if the average bit count required in each cycle is 130 [bits] which is the average of 87 [bits] and 174 [bits], this concrete example can reduce the program memory consumption amount by about (130−72)/130=45[%] to (130−90)/130=30[%] in average as compared with the related technique.

Figure 10:
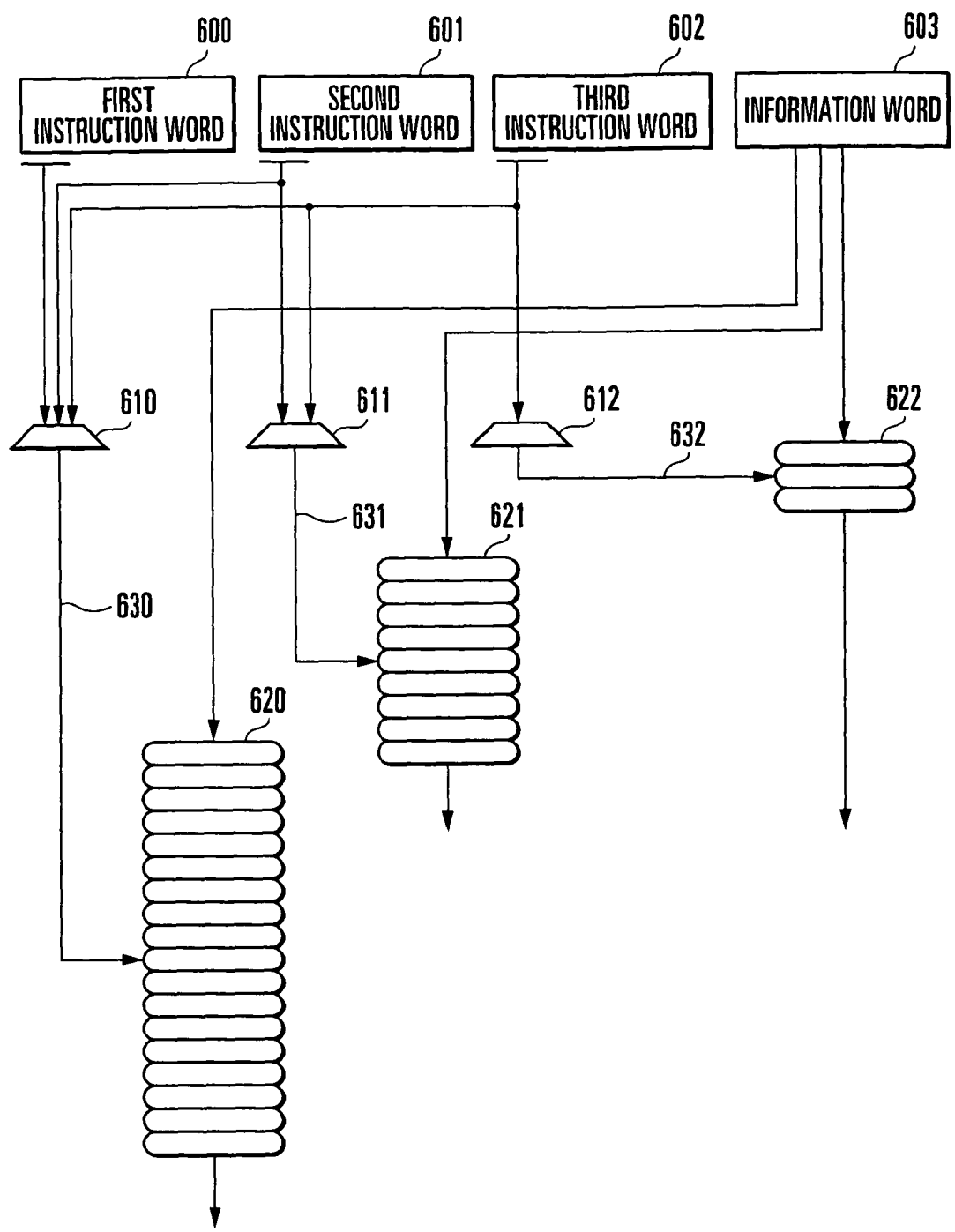
FIG. 10 is a block diagram showing the arrangement of part of an instruction word restoration unit as a concrete example of the second exemplary embodiment of the present invention.

The arrangement of a concrete example of the second exemplary embodiment will be described next with reference to the accompanying drawings. FIG. 10 is a block diagram showing the arrangement of part of the instruction word restoration unit 200 according to the concrete example of the second exemplary embodiment of the present invention. Referring to FIG. 10, the instruction word restoration unit 200 includes a decoder 610, a decoder 611, a decoder 612, a selection signal 630, a selection signal 631, a selection signal 632, a selection circuit 620, a selection circuit 621, and a selection circuit 622.

The decoder 612 decodes the opcode of a third instruction word 602, and outputs the selection signal 632 for selecting an excess operand of the third instruction word 602. The decoder 611 decodes the opcodes of a second instruction word 601 and the third instruction word 602, and outputs the selection signal 631 for selecting an excess operand of the second instruction word 601. The decoder 610 decodes the opcodes of a first instruction word 600, the second instruction word 601, and the third instruction word 602, and outputs the selection signal 630 for selecting an excess operand of the first instruction word 600.

If, for example, the third instruction is of the types M, N, and O, the decoder 612 outputs the selection signal 632 so as to select A [bits], B [bits], and C [bits] from the end of an information word 603. If, for example, the third and second instructions are of the type O and the type N, respectively, the decoder 611 outputs the selection signal 631 so as to select B [bits] from a position shifted forward from the end of the information word 603 by C [bits]. If, for example, the third, second, and first instructions are of the type O, the type N, and the type M, respectively, the decoder 610 outputs the selection signal 630 so as to select A [bits] from a position shifted forward from the end of the information word 603 by B+C [bits].

The selection circuit 620 (18 ways), selection circuit 621 (9 ways), and selection circuit 622 (3 ways) respectively select and output excess operands of the first instruction word 600, second instruction word 601, and third instruction word 602 in accordance with the selection signal 630, selection signal 631, and selection signal 632.

Although not shown, the processor 100 can have the arrangement of a microprogram control scheme. That is, the processor 100 operates in accordance with an instruction control program to implement the respective function units of the instruction supply unit 102, instruction decoder 103, and execution units 108 to 110 described above. This instruction control program can be provided while being recorded on a machine-readable recording medium such as an optical disk or magnetic disk.

When n instructions are to be executed in the same cycle, the first decoder, . . . , the ith decoder, . . . , the nth decoder, and the first selection circuit, . . . , the ith selection circuit, . . . , the nth selection circuit are required. The ith decoder receives the opcodes of the ith instruction, the (i+1)th instruction, . . . , the nth instruction, and outputs the ith selection signal for selecting an excess operand or immediate operand corresponding to the ith instruction word. The ith selection circuit therefore selects an excess operand or immediate operand corresponding to the ith instruction from a corresponding position in the information word in accordance with the ith selection signal.

The delay time of the 18-way selection circuit 62 or the like is long. If the execution time does not fall within one cycle, this concrete example can be implemented by increasing the number of pipeline stages.

As another concrete example, the present invention may be executed in combination with the variable-word-length instruction scheme which is related technique 2. In this case, since it is possible to set the word length of an information word as a basic word length or another prepared word length of an integer multiple, the program memory consumption amount can be further reduced.

In the case of the variable-word-length scheme using two types of word lengths with the minimum word length being Z [bits], referring to FIG. 9, only a word length Y of an information word becomes Z [bits] or 2Z [bits] in each cycle. In this case, it is necessary to increase the bit count of the information word identifier 303 or separately add a bit field for designating a word length in an instruction word or information word.

As described above, the processor 100 of the above exemplary embodiment includes the instruction decoder 103 which decomposes an information word comprising a set of some of the bit fields belonging to a plurality of instruction words executed in the same cycle at the time of execution and restores the original arrangement of each instruction word. More specifically, the instruction decoder 103 extracts bit fields from an information word, and inserts these bit fields at predetermined bit positions of the respective instruction words, thereby restoring the respective instruction words. In more detail, the instruction decoder 103 extracts bit fields from the information word, and inserts these bit fields at the starts or ends of the respective instruction words or predetermined positions determined depending on the opcodes of the respective words, thereby restoring the respective instruction words.

In addition, the processor 100 includes an instruction supply unit 102 which outputs a plurality of instruction words and an information word in the same cycle, an instruction decoder 103 which decodes the respective restored instruction words and outputs control information for the execution of each instruction word, and one or more execution units 108 to 110 which execute each instruction on the basis of control information.

If the maximum number of instructions executed in the same cycle is n, and an information word follows the n instruction words, the instruction supply unit 102 places the information word at the end of the n instructions and outputs the result. If an information word follows m instruction words less than n instruction words, the instruction supply unit 102 may insert n−m NOP instructions next to the n instruction words.

In this case, some of bit fields collected as an information word can be an excess operand or immediate operand whose length is determined by the type of instruction word. In this case, the instruction decoder 103 can include ith decoders 610 to 612 which receive the opcodes of the ith instruction, the (i+1)th instruction, . . . , and the nth instruction and output the ith selection signal for selecting an excess operand or immediate operand corresponding to the ith instruction word, and ith selection circuits 620 to 622 which select an excess operand or immediate operand corresponding to the ith instruction from the corresponding position in the information word in accordance with the ith selection signal.

Although the exemplary embodiments and concrete examples of the present invention have been described in detail with reference to the accompanying drawings, concrete arrangements to be used are not limited to the above exemplary embodiments and concrete examples. The present invention incorporates changes in design and the like within the spirit and scope of the invention.

INDUSTRIAL APPLICABILITY

The present invention can be applied to the implementation of a high-performance processor, e.g., a VLIW (Very Long Instruction Word) type processor, which can reduce the number of bits consumed by a program memory while maintaining the performance and issue a plurality of instructions in a single cycle.

The invention claimed is:

1. A processor, comprising:
an input portion which inputs an information word, and a plurality of partial instruction words; and
a restoring portion which restores a plurality of instruction words from said information word and said plurality of partial instruction words,
wherein said plurality of instruction words are executed in a same cycle,
wherein said plurality of instruction words each include a plurality of bit fields,
wherein said information word is composed by collecting part by part said plurality of bit fields belonging to each of said plurality of instruction words,
wherein said plurality of partial instruction words each comprise each of said plurality of instruction words devoid of the bit fields forming said information word, and
wherein when executing said plurality of instruction words, said restoring portion decomposes said information word into said plurality of bit field and adds each of the resultant bit fields to each of said plurality of partial instruction words to thereby restore said plurality of instruction words.

2. A processor according to claim 1, wherein said restoring portion comprises an instruction decoder which restores said plurality of instruction words from said information word and said plurality of partial instruction words.

3. A processor according to claim 2, wherein said instruction decoder comprises an instruction word restoration unit, which extracts bit fields from said information word and restores respective instruction words by inserting the bit fields at predetermined bit positions in the respective instruction words.

4. A processor according to claim 2, wherein said instruction decoder comprises an instruction word restoration unit, which extracts bit fields from said information word and restores respective instruction words by inserting the bit fields at any of starts and ends of the respective instruction words and predetermined positions determined depending on opcodes of the respective instruction words.

5. A processor according to claim 2, further comprising:
an instruction supply unit which outputs a said plurality of partial instruction words, and said information word to said instruction decoder in the same cycle; and
at least one execution unit which executes an instruction on the basis of control information,
wherein said instruction decoder comprises individual instruction decoding units, which decode the respective restored instruction words and output pieces of control information for execution of the respective instruction words to said respective execution units.

6. A processor according to claim 5, wherein said instruction supply unit outputs, when the maximum number of instructions executed in the same cycle is n and an information word follows n partial instruction words, said information word upon placing the respective bit fields at end of the partial instruction words, and outputs, when an information words follows partial instructions words equal in number to m less than n, said information word upon placing n-m NOP instructions at an end of the m partial instruction words and placing the respective bit fields at an end of the NOP instructions in accordance with an order of the partial instruction words.

7. A processor according to claim 1, wherein said bit field forming said information word comprises at least one of an excess operand and an immediate operand having a length determined by a type of said instruction word.

8. A processor according to claim 6, wherein said bit field forming said information word comprises at least one of an excess operand and an immediate operand having a length determined by a type of said instruction word.

9. A processor according to claim 8, wherein said instruction decoder comprises:
an ith decoder which receives, when i is an integer not less than 1 and not more than opcodes of the ith partial instruction word to the nth partial instruction words, and generates and outputs an ith selection signal for selecting one of said excess operand and said immediate operand corresponding to an ith partial instruction word on the basis of a type of each partial instruction word; and
an ith selection circuit, which selects one of said excess operand and said immediate operand corresponding to said ith partial instruction word from a position corresponding to said information word in accordance with the ith selection signal output from said ith decoder.

10. A processor according to claim 1, wherein said restoring portion further comprises:
a decomposition unit which decomposes said information word into said plurality of bit fields; and
a combining unit which restores each instruction word by combining said plurality of partial instruction words from said original arrangement of each instruction word to a corresponding bit field decomposed by said decomposition unit.

11. An instruction control method for a processor, comprising:
inputting an information word and a plurality of partial instruction words; and
restoring a plurality of instruction words from the information word and the plurality of partial instruction words,
wherein said plurality of instruction words are executed in a same cycle, and said plurality of instruction words each comprise a plurality of bit fields,
wherein said information word is composed by collecting part by part said plurality of bit fields belonging to each of said plurality of instruction words,
wherein said plurality of partial instruction words each comprise each of said plurality of instruction words devoid of the bit fields forming said information word, and
wherein the executing of the plurality of instruction words includes decomposing said information word into said plurality of bit fields and adding each of the resultant bit fields to each of said plurality of instruction words to thereby restore said plurality of instruction words.

12. An instruction control method according to claim 11, wherein said restoring the plurality of instruction words comprises causing an instruction decoder to restore said plurality of instruction words from said information word and said plurality of partial instruction words.

13. An instruction control method according to claim 12, wherein said restoring the plurality of instruction words comprises causing the instruction decoder to extract bit fields from said information word and restore the respective instruction words by inserting the bit fields at predetermined bit positions in the respective instruction words.

14. An instruction control method according to claim 12, wherein said restoring the plurality of instruction words comprises causing the instruction decoder to extract bit fields from said information word and restore the respective instruction words by inserting the bit fields at any of starts and ends of the respective instruction words and predetermined positions determined depending on opcodes of the respective words.

15. An instruction control method according to claim 12, further comprising:
    causing an instruction supply unit of the processor to output said plurality of partial instruction words, and said information word to the instruction decoder in the same cycle:
    causing the instruction decoder to decode each restored instruction word and output control information for execution of each instruction word to at least one execution unit of the processor; and
    causing the execution unit to execute an instruction on the basis of the control information.

16. An instruction control method according to claim 11, wherein the restoring of the plurality of instruction words from the information word and the plurality of partial instruction words comprises:
    decomposing said information word into said plurality of bit fields; and
    combining a said partial instruction word from an original arrangement of each instruction word to a corresponding bit field obtained by decomposition.

17. A tangible computer readable medium embodying a program of machine readable instructions executable by a digital processing apparatus to perform an instruction control method, the method comprising:
    inputting an information word and a plurality of partial instruction words; and
    restoring a plurality of instruction words from the information word and the plurality of partial instruction words,
    wherein said plurality of instruction words are executed in a same cycle, and said plurality of instruction words each comprise a plurality of bit fields,
    wherein said information word is composed by collecting part by part said plurality of bit fields belonging to each of said plurality of instruction words,
    wherein said plurality of partial instruction words each comprise each of said plurality of instruction words devoid of the bit fields forming said information word, and
    wherein the executing of the plurality of instruction words includes decomposing said information word into said plurality of bit fields and adding each of the resultant bit fields to each of said plurality of instruction words to thereby restore said plurality of instruction words.

18. A tangible computer readable medium embodying a program of machine readable instructions executable by a digital processing apparatus to perform an instruction control method according to claim 17, wherein said restoring the plurality of instruction words comprises:
    extracting bit fields from said information word; and
    restoring the respective instruction words by inserting the bit fields at predetermined bit positions in the respective instruction words.

19. A tangible computer readable medium embodying a program of machine readable instructions executable by a digital processing apparatus to perform an instruction control method according to claim 17, wherein said restoring the plurality of instruction words comprises:
    extracting bit fields from said information word; and
    restoring the respective instruction words by inserting the bit fields at any of starts and ends of the respective instruction words and predetermined positions determined depending on opcodes of the respective words.

20. A tangible computer readable medium embodying a program of machine readable instructions executable by a digital processing apparatus to perform an instruction control method according to claim 17, wherein said method further comprises:
    outputting said plurality of partial instruction words, and said information word in the same cycle,
    decoding each restored instruction word and generating control information for execution of each instruction word; and
    executing an instruction on the basis of the generated control information.

21. A tangible computer readable medium embodying a program of machine readable instructions executable by a digital processing apparatus to perform an instruction control method according to claim 17, wherein said restoring the plurality of instruction words comprises:
    decomposing an information word into said plurality of bit fields; and
    combining said partial instruction word from an original arrangement of each instruction word to a corresponding bit field obtained by decomposition.

* * * * *